Jan. 25, 1944.   W. J. BOYER   2,340,171
METHOD OF MAKING ANTISKID CHAINS
Filed July 3, 1939

INVENTOR
William J. Boyer, deceased
By Frederick E. L. Boyer,
Administrator.

Patented Jan. 25, 1944

2,340,171

UNITED STATES PATENT OFFICE 2,340,171

METHOD OF MAKING ANTISKID CHAINS

William J. Boyer, deceased, late of Wilmington, Del., by Frederick G. L. Boyer, administrator, Hamilton, Ohio, assignor to Frederick G. L. Boyer, Hamilton, Ohio Application July 3, 1939, Serial No. 282,711

5 Claims. (Cl. 59—35)

This invention relates to anti-skid chains and more specifically to an improvement on the devices of prior Patent No. 1,651,439. It has for its primary object the provision of an improved form of chain in which the major portion of the wear is taken by the hard surfaced heads of studs which are loosely mounted in and project beyond the links so they are free to rotate and to tilt and wedge with corners digging into the roadway giving increased traction and resistance to skidding, and in which the studs can not come out of the links without destruction of stud or link. An allied object is to provide a chain structure which shall possess all of the advantages over the prior art structures possessed by the devices of the aforesaid patent, and which shall be free from the accompanying disadvantages. A further object of the invention is to provide a method by which the studs may be irremovably enclosed in the individual links of a chain. Another object is to provide a method by which a chain having hard surfaced one-piece studs enclosed in hard surfaced links may be produced without having abnormal strains in the parts which may cause breakage in service.

To this end the invention provides a novel type of chain structure and a novel process of manufacture which makes possible the construction of the novel form of chain.

In its outward appearance the new chain resembles that shown in Patent 1,651,439, and possesses all of the advantages of that chain. The chain of the previous invention, however, in spite of its great advantages, was not trouble free due to the fact that no form of screwing, riveting, or welding, has been found which will produce studs able to withstand the severe punishment to which they are subjected in high speed driving over paved roadways. Invariably the attached heads of some of the studs have come loose and the studs have been thrown from the chains constituting a definite hazard, as well as reducing the gripping power of the chain, and leaving the links to take the wear, thus prematurely ending the life of the chain.

In the present invention it has been found possible to overcome these disadvantages by making the studs unitary structures—each one piece of solid steel cut substantially spool shaped and so placed in the chain link that it cannot come out without destroying either the stud or the link or both. Obviously, such a structure, which can not be taken apart without destruction of some of its parts, can not be assembled by the usual processes. The present invention, therefore, includes a novel method of manufacture by virtue of which it is possible to permanently build one-piece studs into the links of a chain.

The invention will be better understood by reference to the accompanying drawing in which.

Figure 1:
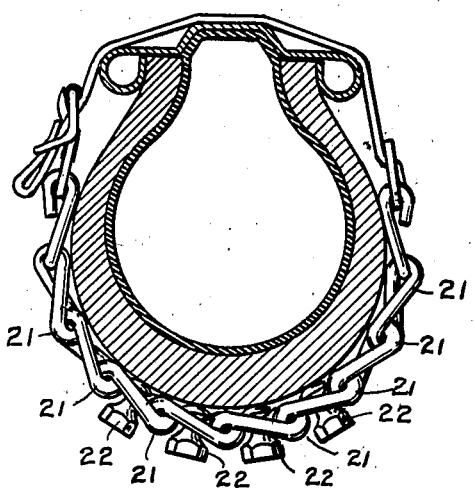
Fig. 1 is a sectional view of a tire and rim, with one of the novel cross chains carrying studs according to the present invention, in place thereon.
Figure 2:
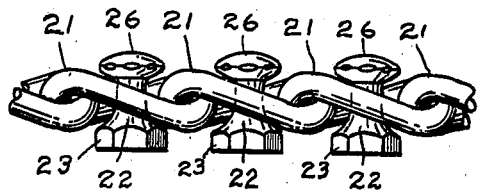
Fig. 2 is a detail view showing several links of a chain carrying studs.
Figure 3:
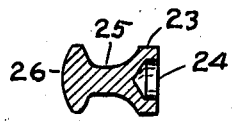
Fig. 3 is a detail view of one of the unitary studs in cross section taken on line 3—3 of Fig. 4.
Figure 4:
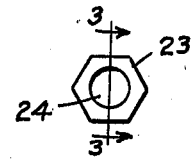
Fig. 4 is an end view of one of the studs showing the surface normally presented to the roadway.
Figure 8:
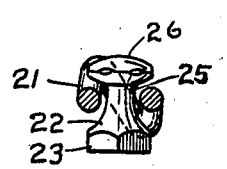
Fig. 8 is a view of the same after twisting, showing how the opening in the link has been narrowed till the stud is loosely but irremovably held therein.

Referring to Figs. 1 and 2 the chain comprises the usual twisted links 21, each link being twisted through an angle of approximately 90 degrees so that all of links lie with corresponding portions parallel when the chain is straight. In the openings in those links which lie across the tread of the tire, the number depending on the pitch of the chain and the size of the tire, are substantially spool-shaped studs 22. Each stud has a large wear receiving head 23, which may be of any suitable shape as described in the aforesaid prior patent, but is advantageously a sharp cornered hexagon, provided with a central recess 24 to prevent the head from becoming rounded and smooth in service. Beyond a shank 25 of reduced diameter is a rounded head 26 of substantially the same diameter as head 23. The shank 25 of each stud extends through the opening in one of the links 21. As will be apparent from Fig. 8 shank 25 fits loosely in the opening in link 21 so that the stud can turn and rock therein, while heads 23 and 26 are each considerably larger than the opening in the link. Inasmuch as both studs and links are normally rather deeply surface hardened it is impossible to distort the parts to remove the stud without actually fracturing and destroying link or stud. There is thus no danger of the studs coming out in service until the chain is worn out. This form of chain is therefore vastly superior to the prior forms which were never free from this danger or else were totally lacking in the long wearing and skid preventing properties characteristic of chains carrying free moving, sharp cornered studs in their road-contacting links.

The assembly of hard one-piece studs in hard links, in which the openings are too small to permit passage of either head of the stud, can not be accomplished in the known manner for such assemblies, as was the case when using the riveted-head studs of the prior patent hereinbefore mentioned, in which the shanks of the studs were passed through the links after which the retaining heads were screwed, riveted, or welded on, to hold the studs in the links. The problem in the present case is complicated by the fact that the surface hardened links can not be opened to admit, or closed to retain the studs without at least causing surface fractures or strains which soon spread and cause breakage in service.

It has been found, however, that studs can, by proper methods, as hereinafter more particularly described, be inserted in unhardened links of low carbon plain or alloy steel and the links closed around them. It has further been discovered that the entire assembly of links and studs can then, by use of due care, be successfully carburized and surface hardened, thus giving a hardened assembly which will resist wearing for long periods and which can not be disassembled without fracture of the parts. Surface hardening is preferred in this case because it gives a wear resistant surface but leaves a tough core which resists fracture, and thus greatly prolongs the life of the structure.

Figure 5:
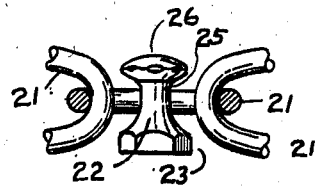
Figs. 5 and 6 are two views showing the method of inserting studs in the links before twisting.
Figure 6:
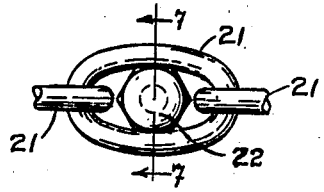
Figure 7:
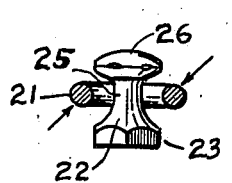
Fig. 7 is a section, taken on line 7—7 of Fig. 6, of an untwisted link after the insertion of a stud, showing the direction of application of the twisting forces.

The insertion of the studs into the links is advantageously accomplished by forming the chain links sufficiently open to pass the head of a stud, welding the links, then after welding and before twisting the links, inserting the studs (see Figs. 5 and 6), and thereafter twisting the links, each link being twisted as usual through an angle of approximately 90 degrees, so that the studs in adjacent links will all face the pavement as illustrated in Figs. 1 and 2. Comparison of Figs. 7 and 8 will show how this twisting narrows the opening in the link to prevent escape of the stud.

Figure 9:
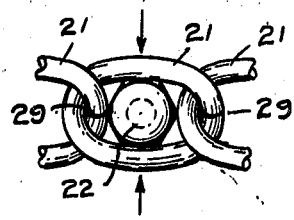
Fig. 9 is a view showing an alternative method of closing the link to retain the stud.

It is possible, if desired, to both weld and twist the chain before inserting the studs, if the links are made sufficiently open to pass the stud heads after twisting. It is then necessary to close the links to retain the studs. This can advantageously be accomplished by application of pressure from the sides as indicated by the arrows in Fig. 9. If the twisted links are not sufficiently open to pass the stud heads the links which are to receive the studs must be opened to the extent necessary. This method must be used with discretion since the added strain due to the bending of the links, in addition to the twisting, may weaken the weld and cause failure in service. When using this method it is particularly advantageous to weld the links at their ends, as shown at 29 (Fig. 9), where the weld is substantially free from stress due to twisting and the stress due to bending is less than on the sides.

Instead of carburizing and surface hardening the assembly of studs and links as described, it is possible to assemble suitably hardened studs into unhardened links, by any of the methods described and thereafter to omit the carburizing and surface hardening operation. By use of wear resisting types of steel for the links useful structures can be made in this manner. Heat treatment after assembly may in some cases be used to increase the resistance to wear, if desired.

Although it may be possible to distort the unhardened links, sufficiently to permit removal of the studs, without actual fracture of the links, yet this is something which can not occur as a result of use of the chain. Deformation of a link to this extent would leave it so seriously distorted as to destroy its utility as a link of the chain so that even in this case it may be said that the stud can not be removed without destroying either the link or the stud.

Anti-skid cross chains made as described are adapted for use either on the all-around type of chain or on the so called emergency type which are strapped around a tire and rim, and they are found to be greatly superior in effectiveness and durability to forms known in the prior art, frequently outwearing several sets of ordinary chains.

This application is a continuation in part of application Serial No. 38,479, filed August 29, 1935.

What is claimed is:

1. The process of producing an anti-skid chain which comprises: providing generally spool-shaped, soft steel studs and a chain of soft steel links, certain of the links presenting openings of dimensions to pass a head of one of the studs; assembling a stud with each of said certain links; applying force to said certain links to close said openings to loosely retain the studs therein; said force so applied as to provide a twist to each of said links; and thereafter treating the assembly to harden the surfaces of the links and studs.

2. The process of producing an antiskid chain which comprises: providing a chain of soft steel twisted links, and generally spool-shaped soft steel studs; spreading certain of said links to permit insertion of a stud into each; closing said stud-carrying links by force acting to restore the twist thereto; and thereafter heat treating the assembly to harden the surfaces of both links and studs.

3. The process of producing an anti-skid chain structure which comprises: providing a plurality of soft steel studs of a general spool shape, and a chain of soft steel twisted links of sufficiently open form to pass the heads of said studs, inserting a stud into each of a plurality of links, applying pressure to the sides of said links in a manner to maintain the degree of twist in the links and to narrow the openings therein sufficiently to prevent the removal of the studs, and thereafter hardening the surfaces of links and studs.

4. The process of producing an anti-skid chain structure which comprises: providing a plurality of generally spool-shaped studs, and a chain having a plurality of welded links each link of substantially plane form, inserting a stud through a link and twisting the link thereby narrowing the opening to loosely hold and positively retain the stud.

5. The process of producing an anti-skid chain, which comprises: providing a chain of interlinked welded soft steel links, and a plurality of substantially spool-shaped soft steel studs; inserting a stud through the opening in each of certain selected links; applying force to the links to narrow the openings therein to a degree to loosely hold the studs but to definitely prevent their removal from the respective links, said force being so applied as to assure the presence in each of said links, subsequent to the application of said force thereto, of a twist of approximately ninety degrees; and thereafter treating the assembly to surface harden the links and studs.

FREDERICK G. L. BOYER,
Administrator of the Estate of William J. Boyer, Deceased.